United States Patent
Pardo (10) Patent No.: US 6,266,539 B1
(45) Date of Patent: Jul. 24, 2001

(54) TELEPHONE DOCKING STATION FOR PERSONAL DIGITAL ASSISTANT

(75) Inventor: Teddy Pardo, Hod-Hasharon (IL)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/096,462

(22) Filed: Jun. 12, 1998

(51) Int. Cl.⁷ .................................................. H04B 1/38
(52) U.S. Cl. .................... 455/556; 379/93.05; 379/93.24
(58) Field of Search ................................... 455/556, 557, 455/566, 90, 575; 703/23, 27; 710/101; 379/90.01, 93.24, 93.25, 110.01, 93.01, 93.05

(56) References Cited

U.S. PATENT DOCUMENTS

| | | | |
|---|---|---|---|
| 4,769,764 | 9/1988 | Levanon | 364/708 |
| 5,052,943 | 10/1991 | Davis | 439/357 |
| 5,187,645 | 2/1993 | Spalding et al. | 363/391 |
| 5,195,183 | 3/1993 | Miller et al. | 395/275 |
| 5,227,614 | 7/1993 | Danielson et al. | 235/380 |
| 5,264,992 | 11/1993 | Hogdahl et al. | 367/681 |
| 5,329,427 | 7/1994 | Hogdahl | 361/730 |
| 5,331,580 | 7/1994 | Miller et al. | 364/708 |
| 5,408,382 | 4/1995 | Schultz et al. | 361/686 |
| 5,468,947 | 11/1995 | Danielson et al. | 235/472 |
| 5,497,464 | 3/1996 | Yeh | 395/200.01 |
| 5,515,303 | 5/1996 | Cargin, Jr. et al. | 364/708.1 |
| 5,544,010 | 8/1996 | Schultz et al. | 361/686 |
| 5,602,456 | 2/1997 | Cargin, Jr. et al. | 320/2 |
| 5,606,594 | 2/1997 | Register et al. | 379/58 |
| 5,625,555 | 4/1997 | Davis | 364/423 |
| 5,633,782 | 5/1997 | Goodman et al. | 361/683 |
| 5,633,920 | 5/1997 | Kikinis et al. | 379/130 |
| 5,644,471 | 7/1997 | Schultz et al. | 361/686 |
| 5,666,495 | 9/1997 | Yeh | 395/281 |
| 5,668,977 | * 9/1997 | Swanstrom et al. | 703/23 |
| 5,675,524 | 10/1997 | Bernard | 364/705.05 |
| 5,689,654 | 11/1997 | Kikinis et al. | 395/281 |
| 5,712,761 | 1/1998 | Dials et al. | 361/685 |
| 5,802,460 | * 9/1998 | Parvulescu et al. | 455/556 |
| 5,822,546 | * 10/1998 | George | 710/101 |
| 6,009,336 | * 12/1999 | Harris et al. | 455/556 |

FOREIGN PATENT DOCUMENTS

| | | | |
|---|---|---|---|
| 0704788A2 | 4/1996 | (EP) | G06F/1/16 |
| 0722138A1 | 7/1996 | (EP) | G06F/1/18 |

OTHER PUBLICATIONS

"Ascom Carry", Dacon Electronics PLC, 1997.
"CIDCO IPHONE", The Online Store, Printout from web site.
"Palm Pilot Modem", 3COM, Printout from web site.

* cited by examiner

Primary Examiner—Nay Maung
Assistant Examiner—Quochien B. Vuong
(74) Attorney, Agent, or Firm—Thelen Reid & Priest LLP (57) ABSTRACT

A telephone docking station for a personal digital assistant provides a simple docking arrangement in conjunction with a basic telephone circuit that exploits all of the resident intelligence of a PDA in connection with the telephone circuit to extend the PDA's functionality to the telephone, while extending the telephone's communications capability to the PDA. The docking arrangement preferably consists of a docking slot or port provided within the telephone housing itself by which the PDA is readily received and secured to the telephone, and by which an electrical interconnection or infrared (i.e. digital) is made to the telephone circuitry within the telephone housing. Software installed on the PDA implements desired communications functions, such as automatic dialing of a phone number stored in the PDA directory, the receipt and transmission of email, provides the ability to access electronic networks, such as the Internet, e.g. to browse the World Wide Web, and various custom calling services such as: three-way calling, call forwarding caller-id blocking, and call return.

12 Claims, 9 Drawing Sheets

FIG. 14 ical Field

The invention relates to telecommunications. More particularly, the invention relates to a telephone docking station for a personal digital assistant.

2. Description of the Prior Art

A category of portable electronic device, referred to as a personal digital assistant (PDA) provides various productivity applications, such as a calendar and an address book, in a convenient, hand held form factor. Currently, one of the most popular PDAs is the Palm Pilot, manufactured by 3Com Corporation. PDA's also provide certain telecommunications functions through the use of a separate modem. Such modem may be an external device, as in the case of the Palm Pilot, a built in software modem as in the case of some palm size PCs, or it may be an internal PC card, as in the case of the Apple Newton, manufactured by Apple Computer Corporation. The telecommunications functions provided by a PDA when operated in conjunction with a modem can include the sending and receiving of email and access to computer networks, such as the Internet.

It is known to provide a modular computer system, such as would include a PDA, which may be docked to a base station to provide enhanced functionality, such as telecommunications capability. See, for example I. Levanon, Modular Computer System With Portable Travel Unit, U.S. Pat. No. 4,769,764 (Sep. 6, 1988); P. Hogdahl, Modular Computer System Having An Improved Docking Assembly, U.S. Pat. No. 5,329,427 (Jul. 12, 1994); K. Yeh, Address Mapping Logic For Transferring Data Between A Peripheral Device of a Base Function Expander Unit and A Palmtop Computer As If the Peripheral Was A Peripheral of the Computer, U.S. Pat. No. 5,497,464 (Mar. 5, 1996); P. Hogdahl, W. Hart, C. Krallman, K. Shaw, Modular Computer System Having Self Contained Workslate Unit Detachably Coupled To Base Unit Including Keyboard, U.S. Pat. No. 5,264,992 (Nov. 23, 1993); A. Danielson, D. Durbin, Pocket Size Data Capture Unit With Processor and Shell Modules, U.S. Pat. No. 5,468,947 (Nov. 21, 1995); A. Danielson, D. Durbin, Core Computer Processor Module, and Peripheral Shell Module Assembled To Form A Pocket Size Data Capture Unit, U.S. Pat. No. 5,227,614 (Jul. 13, 1993); K. Yeh, Method and Structure For Data Transfer Between A Standard Port of A Host Computer and A Custom Port of A Palmtop Computer Using A Docking Station, U.S. Pat. No. 5,666,495 (Sep. 9, 1997); D. Schultz, A. Danielson, A. Bunte, R. Sherman, R. Jaeager, Portable Dock ForA Portable Electronic Device, U.S. Pat. No. 5,644,471 (Jul. 1, 1997); T. Spalding, K. Kowal, J. Bleck, S. Wakefield, J. Thrailkill, Portable Computer with Docking Connector For Peripheral Devices, U.S. Pat. No. 5,187,645 (Feb. 16, 1993); D. Schultz, A. Danielson, A. Bunte, R. Sherman, R. Jaeger, Portable Electronic Device Docking system, U.S. Pat. No. 5,544,010 (Aug. 6, 1996); D. Kikinis, P.

Dornier, W. Seiler, Digital Assistant System Including A Host Computer With A Docking Bay for the Digital Assistant Wherein A Heat Sink I s Moved Into Contact with a Docked Digital Assistant for Cooling the Digital Assistant, U.S. Pat. No. 5,689,654 (Nov. 18, 1997); P. Davis, Recharging and Data Retrieval Apparatus, U.S. Pat. No. 5,052,943 (Oct. 1, 1991); K. Cargin, D. Boatwright, S. Kelly, W. Gibbs, Hand Held Computerized Data Collection Terminal with Rechargeable Battery Pack Sensor and Battery Power conservation, U.S. Pat. No. 5,602,456 (Feb. 11, 1997); P. Davis, Data Communication System with Adapter for Removable Coupling of Portable Data Terminals, U.S. Pat. No. 5,625,555 (Apr. 29, 1997); E. Dials, D. Herring, A. Hodges, S Luglan, Computer System Having Cooperating Spring, Gear Tracks and Geared Dampers For Allowing A Drive Housing To Move Between Open and Closed Positions, U.S. Pat. No. 5,712,761 (Jan. 27, 1998); K. Cargin, R. Mahany, D. Durbin, D. Boatwright, S. Kelly, D. Schultz, W. Gibbs, Hand-Held Computerized Data Collection Terminals With Rechargeable Battery Pack Sensor and Battery Power Conservation, U.S. Pat. No. 5,515,303 (May 7, 1996 P. Miller, R. Traeger, J. Kubler, K. Cargin, G. Hanson, P. Davis, D. Schultz, Data Communications System With Communicating and Recharging Docking Apparatus For Hand-Held Data Terminal, U.S. Pat. No. 5,195,183 (Mar. 16, 1993); P. Miller, S. Koenck, J. Walter, J. Kubler, K. Cargin, G. Hanson, P. Davis, S. Kunert, D. Schultz, Data Capture System With Communicating and Recharging Docking Apparatus, and Modular Printer and Hand-Held Data Terminal Means Cooperable Therewith, U.S. Pat. No. 5,331,580 (Jul. 19, 1994 D. Schultz, A. Danielson, R. Jaeger, A. Bunte, R. Sherman, Terminal and Docking Mechanism With Open Channel Members and Guide Rollers, U.S. Pat. No. 5,408,382 (Apr. 18, 1995); W. Goodman, C. Hattan, J. Sherman, P. Wormsbecher, Docking Station For A Portable Computer With A Hinged Support Frame and Movable Receptacle Assembly, U.S. Pat. No. 5,633,782 (May 27, 1997); and E. Flint, J. Karidis, G. McVicker, W. Pence, A cartridge-based design for portable and fixed computers, European Patent Application No. EP0722138.

It is also known to provide various form factors and features for a telephone. See, for example D. Kikinis, P. Dornier, Smart Phone, U.S. Pat. No. 5,633,920 (May 27, 1997) and Ascom Carry, Dacon Electronics PLC (copyright PSion PLC 1997).

With regard to the smart phone disclosed in the Ô920 patent, a substantial cost of manufacture is encountered in producing the telephone, for example in providing the electronics and software necessary to implement the various intelligent features offered by the telephone's design. While such smart phone is able to accommodate a device, such as a PDA, in a cutaway slot, such that the telephone allows operation of various features of the PDA in connection with operation of the telephone, the PDA typically operates under control of the smart phone, much like a peripheral device, and does not operate or control the smart phone itself.

With regard to the Ascom Carry device, a sidecar type adapter is provided that connects a PDA (in this case, a Psion PDA) to a smart telephone, such that the smart telephone can use the address book feature of the PDA. Thus, only Is limited functionality of the PDA is used by the smart telephone. Such telephone itself is an expensive and complicated electronic device. The Ascom Carry device is limited to expensive, already-smart PBX telephones which have an external port. It has no modem and is limited to controlling telephony functions, no Internet functionality Is possible.

Also known is a dedicated "Web phone," such as the iphone, manufactured by Cidco, or the Nokia 9000. While these devices are very well integrated, they are expensive and provide all or nothing" functionality (i.e. they are not adapted to exploit the functionality of an outboard device, such as a PDA, but rather must include full functionality for performing all "Web" functions).

Thus, in the prior art it is known to dock a first expensive and complicated electronic device, e.g. the PDA, with a second expensive and complicated electronic device, e.g. the smart telephone, to allow the smart telephone to access information, typically in the form of address book entries, contained in the PDA. Certain limited use of the PDA's display may also be made, as with the Ascom Carry device.

It would be advantageous to provide a simple docking arrangement in conjunction with a basic telephone circuit that could exploit all of the resident intelligence of a PDA in connection with such telephone circuit without having to duplicate such intelligence in the telephone itself. It would be further advantageous to provide a docking arrangement that readily receives any PDA; that includes software resident on the PDA that implements any desired communications function, such as the receipt and transmission of email, the ability to access an electronic network, such as the Internet, e.g. to browse the World Wide Web; that provides a convenient means to use various custom local area signaling services (CLASS); and that exploits the programmable computer system inherent in the PDA, while simplifying the communications hardware required by the docking element, i.e. the telephone, of the arrangement.

SUMMARY OF THE INVENTION

The invention provides a telephone docking station for a personal digital assistant (PDA). The preferred embodiment of the invention provides a simple docking arrangement in conjunction with a basic telephone circuit that exploits all of the resident intelligence of a PDA in conjunction with the telephone circuit. The docking arrangement preferably consists of a docking slot or port provided within the housing itself by which the PDA readily received and securely retained (at least partially) within the telephone housing, and by which an electrical interconnection is made to the telephone circuitry within the telephone housing. Software installed on the PDA implements desired communications functions, such as the receipt and transmission of email, provides the ability to access electronic networks, such as the Internet, e.g. to browse the World Wide Web, and provides a convenient means to use various custom local area signaling services (CLASS).

Significantly, the invention exploits the programmable computer system inherent in the PDA, while simplifying the communications hardware required by the docking element of the arrangement. In this way, an inexpensive telephone/modem may be provided that both extends the telecommunication capability of a PDA, while allowing use of the PDA's internal functionality. Thus, a basic telephone/modem circuit in a simple housing can import the full functionality of the computer within the PDA, including the CPU, the display, the memory, and the data I/O features, such as a touch screen and/or keyboard. As a result, the basic telephone becomes a smart telephone based upon the PDA's intelligence, while the PDA becomes a full featured communications device.

Because most of the cost of production of such system is required to manufacture the PDA, the invention migrates all required communications functionality to the PDA in the form of software, while requiring only a basic and inexpensive hardware interface (typically, a housing, a connection port, and a modem/telephone chip) between the PDA and the user's telephone service.

BRIEF DESCRIPTION OF THE DRAWINGS

FIG. 10a is an illustration of a telephone docking station having a PDA docked thereto according to the second embodiment of the invention;

DETAILED DESCRIPTION OF THE INVENTION

The invention provides a telephone docking station for a personal digital assistant (PDA). The preferred embodiment of the invention provides a simple docking arrangement in conjunction with a basic telephone circuit that exploits all of the resident intelligence of a PDA in conjunction with the telephone circuit. The docking arrangement preferably consists of a docking slot or port provided within the telephone housing itself by which the PDA readily received and securely retained (at least partially) within the telephone housing, and by which an electrical interconnection is made to the telephone circuitry within the telephone housing. Software installed on the PDA implements desired communications functions, such as the receipt and transmission of email, provides the ability to access electronic networks, such as the Internet, e.g. to browse the World Wide Web, to allow dialing from the address book, from Web pages, and from email messages containing telephone numbers, and to provide a convenient means to use various custom local area signaling services (CLASS) such as three-way calling, call forwarding caller-id blocking, call return.

Significantly, the invention exploits the programmable computer system inherent in the PDA, while simplifying the communications hardware required by the docking element of the arrangement. In this way, an inexpensive telephone/modem may be provided that both extends the telecommunication capability of a PDA, while allowing use of the PDA's internal functionality. Thus, a basic telephone/modem circuit in a simple housing can import the full functionality of the computer within the PDA, including the CPU, the display, the memory, and the data I/O features, such as a touch screen and/or keyboard. As a result, the basic telephone becomes a smart telephone based upon the PDA's intelligence, while the PDA becomes a full featured communications device.

Because most of the cost of production of such system is required to manufacture the PDA, the invention migrates all required communications functionality to the PDA in the form of software, while requiring only a basic and inexpensive hardware interface (typically, a housing, a connection port, and a modem/telephone chip) between the PDA and the user's telephone service.

Figure 1:
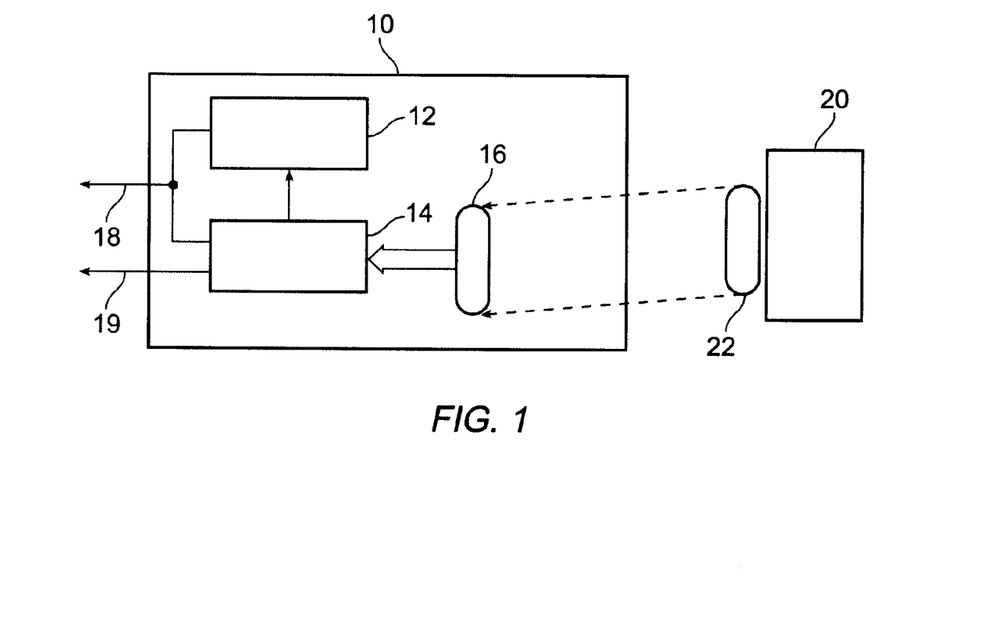
FIG. 1 is a block schematic diagram showing a telephone docking station and a PDA according to the invention.

FIG. 1 is a block schematic diagram showing a telephone docking station and a PDA according to the invention. The telephone docking station 10 comprises an electrical port 16 that establishes an electrical connection with a complementary port 22 provided by the PDA 20. It will be appreciated that the port 16 may be specifically tailored to a particular PDA, such as the Palm Pilot or PSION, and therefore would comprise a connector that mates with the connector provided on the PDA. In other embodiments of the invention, the port 16 may provide a universal interface, a standard interface having adapters for each of the various popular PDAs, or an infrared, RF, or inductive interface. Further, in the case of an infrared or RF interface, the port 16 may be an infrared sensor or RF antenna. Further, the telephone docking station may provide a port for establishing the exchange of data with said PDA, where the port is either integrated with a docking mechanism for physically securing the PDA to the telephone docking port or where the port is separate therefrom, for example where the port is an IR port or separate electrical connector.

The telephone docking station 10 further comprises a telephone circuit 14 for implementing basic telephony features, such as telephone line interface, on-hook/off-hook sense/control, line isolation, ringing, DTMF generation, and dialing. The telephone circuit may be any of the presently available hybrid circuits or it may be an integrated telephone circuit. The output of the telephone circuit (and modem, discussed below) is coupled to a standard telephone connector 18, such as an RJ-11 (in the United States). It will be appreciated that the telephone docking station herein described may provide any line connector as is appropriate for the locality in which the device is used.

The telephone docking station also comprises a modem 12 (if desired) to implement the exchange of digital information over the telephone line and thereby allow network access and email functions. The modem may be any of the presently available modem devices, for example as are manufactured by Rockwell Corporation. Some PDA's, such as some palm size PCs, include a built-in modem. In such cases, it is not necessary to build a modem into the docking telephone.

The telephone docking station may also provide a data port 19 that allows the telephone to be connected to a user's computer, for example to synchronize the PDA calendar or address book with applications on the computer, or to exchange files and/or software between the PDA and the user's computer. In this way, the need for an outboard docking station for use with a computer is eliminated.

The PDA is connected by default to the modem. When the PDA button built into the telephone is pressed, the PDA is connected to the PC instead of the modem and the PDA then operates in Hot Synch mode. When the synchronization operation ends, the PDA returns to modem state.

In default mode, the PDA complements the telephone with an address book, Class functions, and convenient dialing functions. In this mode, the telephone provides physical access to the Internet and enables the use of Web applications on the PDA.

Figure 2:
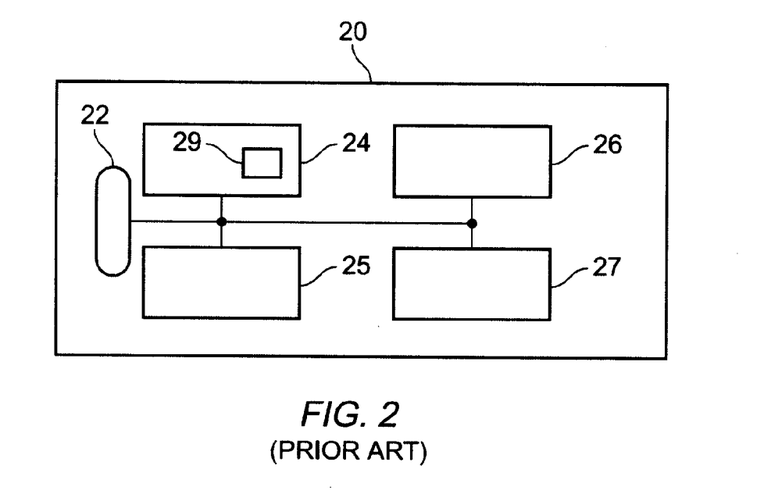
FIG. 2 is a block schematic diagram of a PDA.

FIG. 2 is a block schematic diagram of a PDA. A PDA 20 typically includes a data exchange port 22, which may provide an electrical, optical, or RF data exchange connection; a CPU 25, a memory 24 for storing a program 29, a display 26, and an data entry device 27, such as a touch screen and/or keyboard. It will be appreciated by those skilled in the art that the invention is readily implemented with any of the various popular PDAs, the only requirements being the provision of a data exchange port to allow the PDA to exchange information with the telephone line via the telephone docking station and the ability to load and store a communications program. With regard to the communications program 29 (see FIG. 2), the program resides in the PDA's memory; is typically loaded into the PDA through the data exchange port or via external memory, such as provided by a memory card; and implements any desired telecommunications function. The actual program is readily provided by those skilled in the art. Further, various commercial communications packages are presently available for such PDAs as the Palm Pilot and PSION.

The various telecommunications functions can include any or all of dialing from an address book in the PDA, displaying caller ID information, call logging/time keeping, speed dial, CLASS functions, dialing from a web page, and answering machine (using the PDA's memory for voice message storage). With regard to network functions, the PDA software would include various modem protocols and/or such protocols as TCP/IP to enable the sending and receiving of email and Internet access. Accordingly, any email client and/or web browser may be included in the PDA software. The telephone itself merely provides a connection to the PDA, for example via a serial port, a power supply, a phone connector, a telephone circuit, and a modem (alternatively, the modem may be implemented in software in the PDA). The PDA provides all of the higher level functionality. The docking station is operational as a simple telephone when the PDA is not docked to it. The docking station is also operational as a telephone when the power supply is disconnected.

With regard to dialing from a Web page (stated above): When the Web browser detects a string of numbers that looks like a telephone number, the string of numbers is automatically converted to a link in URL format. This link points to an internal callback function in the PDA software that performs the dialing if the user selects the link.

The invention integrates the PDA and a simple telephone function using a docking station that is less expensive to manufacture than an outboard modem typically available for use with the PDA. A main reason for this is the higher price of low power consumption components used for portable battery operated modems. Further, the invention provides a useful form factor (the telephone) for extending the functionality of a PDA, while at the same time allowing a PDA owner to use the PDA's internal capabilities to implement a smart telephone and/or telecommunications and data exchange computer. Unlike the prior art, the telephone itself is no more expensive than a standard telephone (and a modem if not built in the PDA) because it does not need any of the expensive hardware such as a display, CPU, and memory, or software that is necessary to implement the smart telephone features, the PDA providing this functionality. Thus, the invention reuses the PDA's complement of functional elements within the context of a communications device. Unlike a modem, which may be used with a typical PDA, the invention is a telephone whether or not the PDA is docked thereto. Thus, the telephone docking station may be used as a standard telephone in the absence of the PDA. This is not presently possible with prior art modems and PDA docking stations. Further, because the telephone performs multiple functions, the user's desktop is not cluttered with outboard devices to connect the PDA to a computer or telephone line.

It will be appreciated by those skilled in the art that the invention is readily provided in various form factors.

Figure 3A:
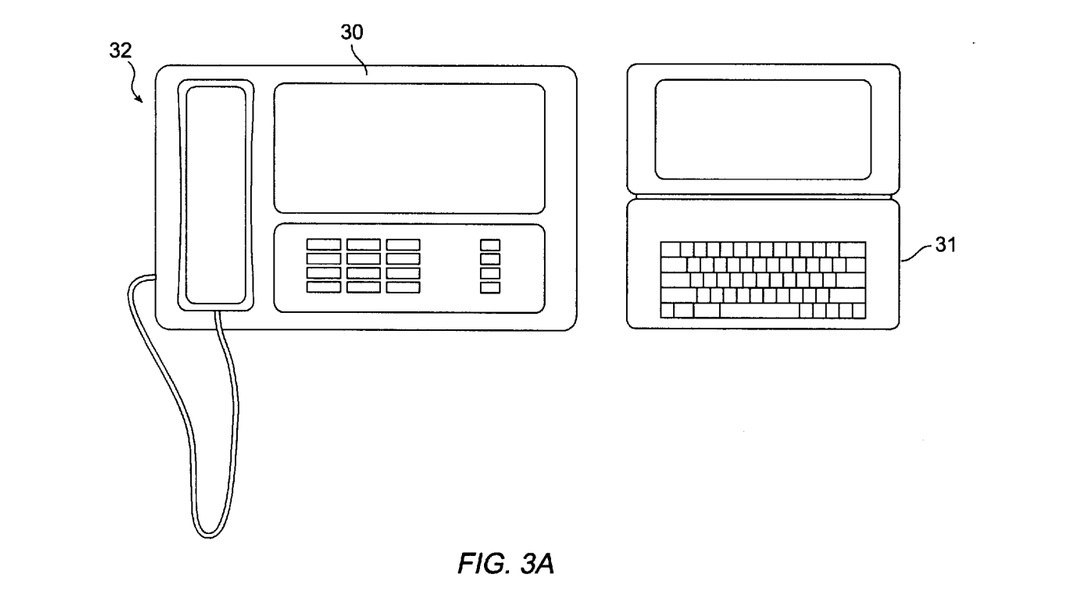
FIG. 3a is an illustration of a telephone docking station and a PDA according to a first embodiment of the invention.

FIG. 3a is an illustration of a telephone docking station and a PDA according to a first embodiment of the invention. In FIG. 3a a telephone docking station 32 includes a docking port 30 for a PDA 1, such as a PSION. The docking port preferably includes an electrical connection to the PDA's data exchange port (typically a serial port), although an electrical connection is not required in the case an IR or RF data exchange facility is provided. The docking port may also provide electrical power to the PDA to either operate the PDA and/or charge the PDA's batteries, if desired.

There is no obligation for the PDA to be rigidly connected to the docking station. Because the screen format of most PDAs is small the PDA can be connected with a spring cord (or infrared) in a way that it can be retractable from the docking station but still be electrically connected.

Because some PDAs already include a microphone and a speaker, there is no obligation for a handset. In this case when the PDA is docked it performs as a speakerphone.

Figure 3B:
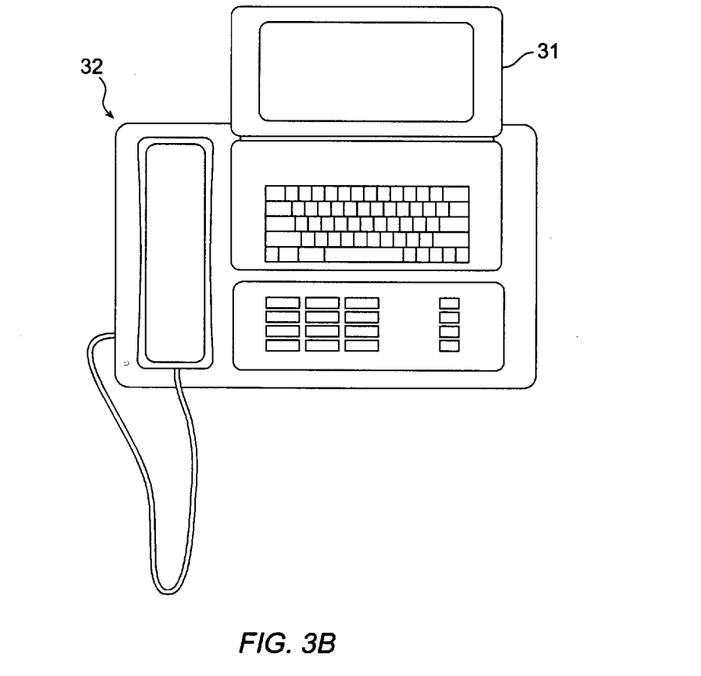
FIG. 3b is an illustration of a telephone docking station having a PDA docked thereto according to the first embodiment of the invention.

The docking port is also preferably configured to accept and securely retain at least a portion of the PDA 31 so that the PDA may be operated while docked to the telephone docking station. The PDA is typically retained in such manner that at least the display and data entry features, such as a touch screen and/or keyboard, are readily accessible by a user. FIG. 3b is an illustration of the telephone docking station 32 having the PDA 31 docked thereto according to the first embodiment of the invention.

Software Interfaces

The protocol between the PDA and the modem should enable the PDA to control the modem and to get event signals and data from the modem when events occurr or when or data is available.

Control commands include:
Σ Dial
Σ Pick Up
Σ Hang Up
Σ Get Line Status
Σ Get Data (e.g. Caller ID)

Whenever an event such as ring, call waiting, or caller ID occurs, the modem sends a signal to the PDA. If the PDA is turned off, the modem may turn the PDA on so that the PDA eventually updates the call log database. Optionally, a protocol such as AT+V, may be used to control the modem whenever available APIs, such as TAPI (Telephony Application Programming Interface) may be used while implementing the PDA software.

User Interfaces

Input Means

The following are the optional user interfaces:
1. Keypad, numbers 0 to 9, *, #, FLASH, MUTE, HOLD, SYNC, speaker (for speaker phone).
2. PDA button to control PDA connection to the telephone line via the modem versus connection to the PC.
3. Handset.
4. Alphanumeric Keyboard for PDA device.

Readability

Most PDAs are designed for operation as a hand held device (and not as a desktop device). This means that the user reads from a short distance—the user holds the PDA in his or her palm and can bring it closer if the distance is too big.

There are two options for DDS:
Σ Use bigger fonts and icons for all the relevant screens;
Σ Attach the PDA to the Docking telephone by a retracting cord.

Telephony Screens

Figure 4:
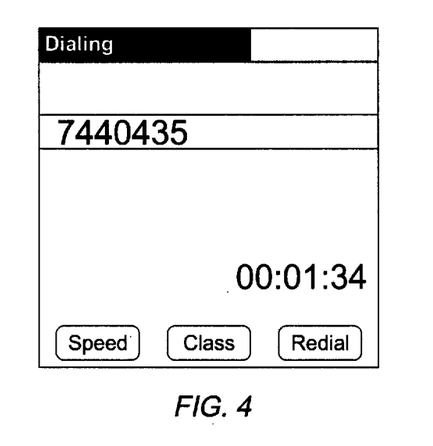
FIG. 4 is a screen display for a PDA that illustrates dialing status according to the invention.
Figure 5:
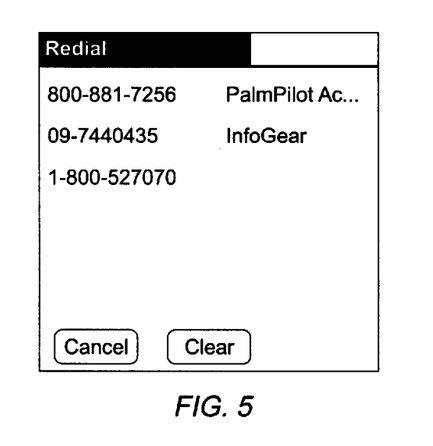
FIG. 5 is a screen display for a PDA that illustrates redialing status according to the invention.
Figure 6:
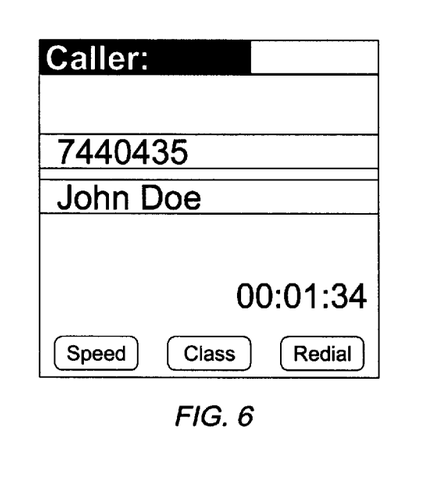
FIG. 6 is a screen display for a PDA that illustrates a call being received according to the invention.
Figure 7:
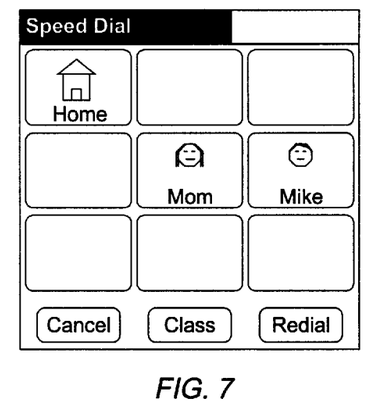
FIG. 7 is a screen display for a PDA that illustrates a speed dialing function according to the invention.
Figure 8:
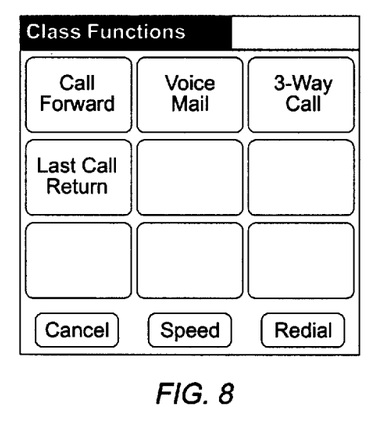
FIG. 8 is a screen display for a PDA that illustrates telephony class functions according to the invention.
Figure 9:
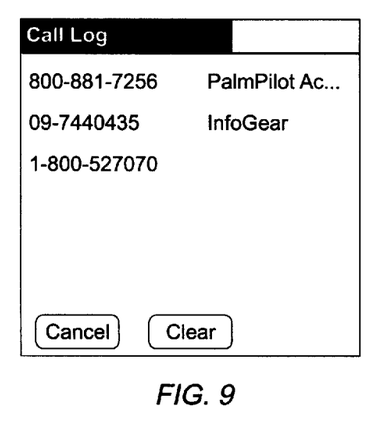
FIG. 9 is a screen display for a PDA that illustrates a caller log according to the invention.

The following discussion relates to FIGS. 4–9, which illustrate various screens that are displayed on the PDA in connection with operation of the invention:

Σ Dialing Status: FIG. 4 is a screen display for a PDA that illustrates dialing status according to the invention;

Σ Redialing Status: FIG. 5 is a screen display for a PDA that illustrates redialing status according to the invention;

Σ Receiving a Call: FIG. 6 is a screen display for a PDA that illustrates a call being received according to the invention;

Σ Speed Dial Screen: FIG. 7 is a screen display for a PDA that illustrates a speed dialing function according to the invention;

Σ Telephony Class Features: FIG. 8 is a screen display for a PDA that illustrates telephony class functions according to the invention; and Σ Caller Log: FIG. 9 is a screen display for a PDA that illustrates a caller log according to the invention.

Hardware Interfaces

The docking telephone described herein requires jacks, cables, and connectors not normally found on a standard telephone.
1. Serial port connector to connect the docking telephone to a PC for Synchronization (HotSync).
2. PDA docking serial connector, compatible with specific PDAs.
3. RJ11 telephone jack for the telephone line.
4. Power supply with plug suitable to country of service. The AC side of the power supply should comply with major national market requirements.

Communication Interfaces

The docking telephone supports POTS communication with touch tone dialing. The communications interface with the PDA and with the PC is serial. If an internal modem is not supplied, then the docking telephone provides a serial interface for the modem.

User Characteristics and Environmental Requirements

The user may want to disconnect the PDA and use it offline for such typical PDA applications as address book maintenance, scheduling meetings, and portable telephone book. The user may periodically connect the PDA to the PC to upload/download personal data, such as new telephone numbers, and possibly to print out data and perform data maintenance. The user may also want to use the PDA to ease the use of his telephone, access Web sites and email via his telephone, perhaps use Web access for such applications as on-line yellow pages, or have the convenience of access to Web access while away from the PC in the office. It is possible that the docking telephone is used in a hot and humid kitchen. Because the docking telephone does not especially require a PC, it may be used in many rugged non-office environments where a telephone or a telephone and a PDA are used today. For example—a person uses the integrated smart phone to read email and selected Web sites before going to sleep; during the night the smart phone automatically polls the email; the person reads the email on the way to work. The docking telephone may be used in a domestic setting, including a kitchen, or in an office in any type of industrial environment.

Figure 10A:
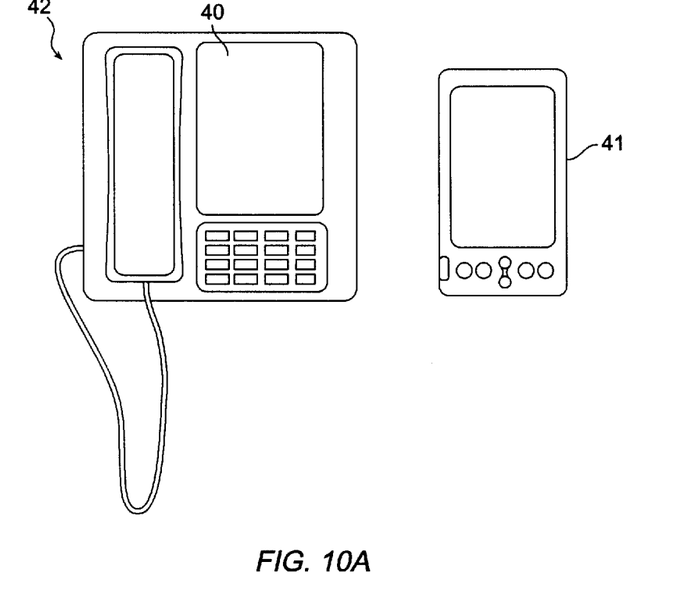
FIG. 10a is an illustration of a telephone docking station and a PDA according to a second, equally preferred embodiment of the invention.
Figure 10B:
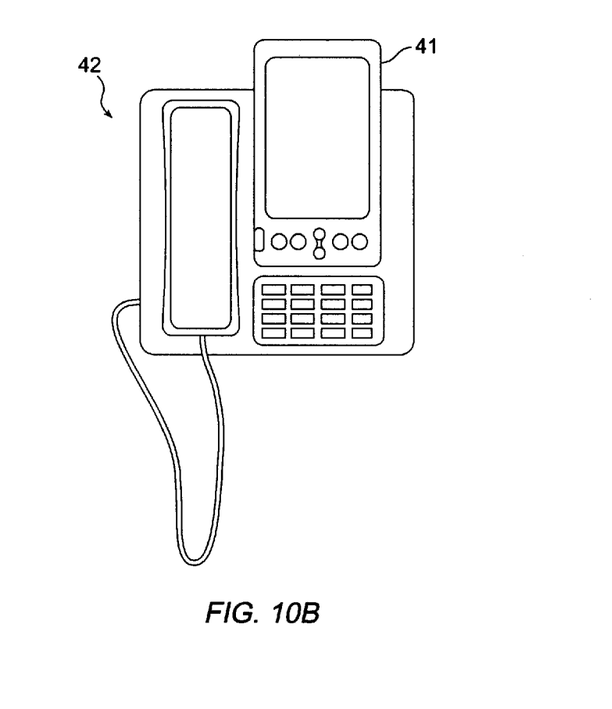

FIG. 10a is an illustration of a telephone docking station and a PDA according to a second, equally preferred embodiment of the invention. In FIG. 10a a telephone docking station 42 includes a docking port 40 for a PDA 41, such as a Palm Pilot. FIG. 10b is an illustration of the telephone docking station 42 having the PDA 41 docked thereto according to the second embodiment of the invention.

Figure 11A:
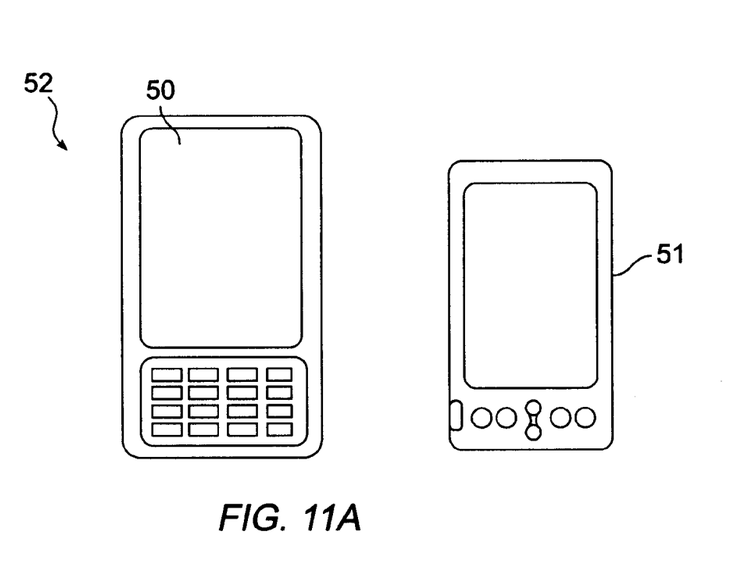
FIG. 11a is an illustration of a docking station and a PDA according to a third, equally preferred embodiment of the invention.
Figure 11B:
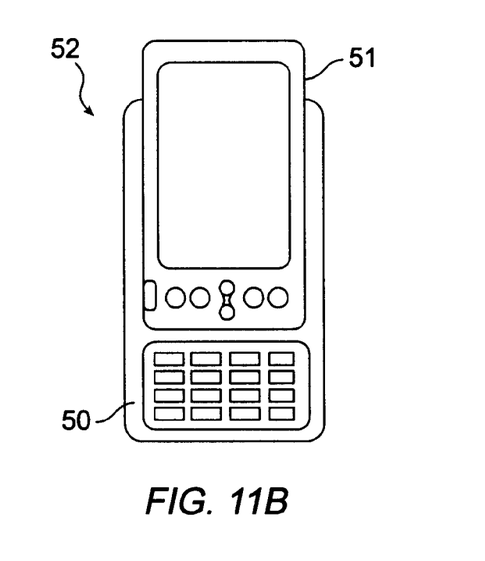
FIG. 11b is an illustration of the telephone docking station 52 having the PDA 51 docked thereto according to the third embodiment of the invention.

FIG. 11a is an illustration of a docking station and a PDA according to a third, equally preferred embodiment of the invention. In FIG. 11a a docking station 52 includes a docking port 50 for a PDA 51, such as a Palm Pilot, but does not include a telephone handset. In this embodiment of the invention, the microphone and speaker of the PDA are used for telephonic communication. FIG. 11b is an illustration of the telephone docking station 52 having the PDA 51 docked thereto according to the third embodiment of the invention.

Specific Hardware Implementations

Figure 12:
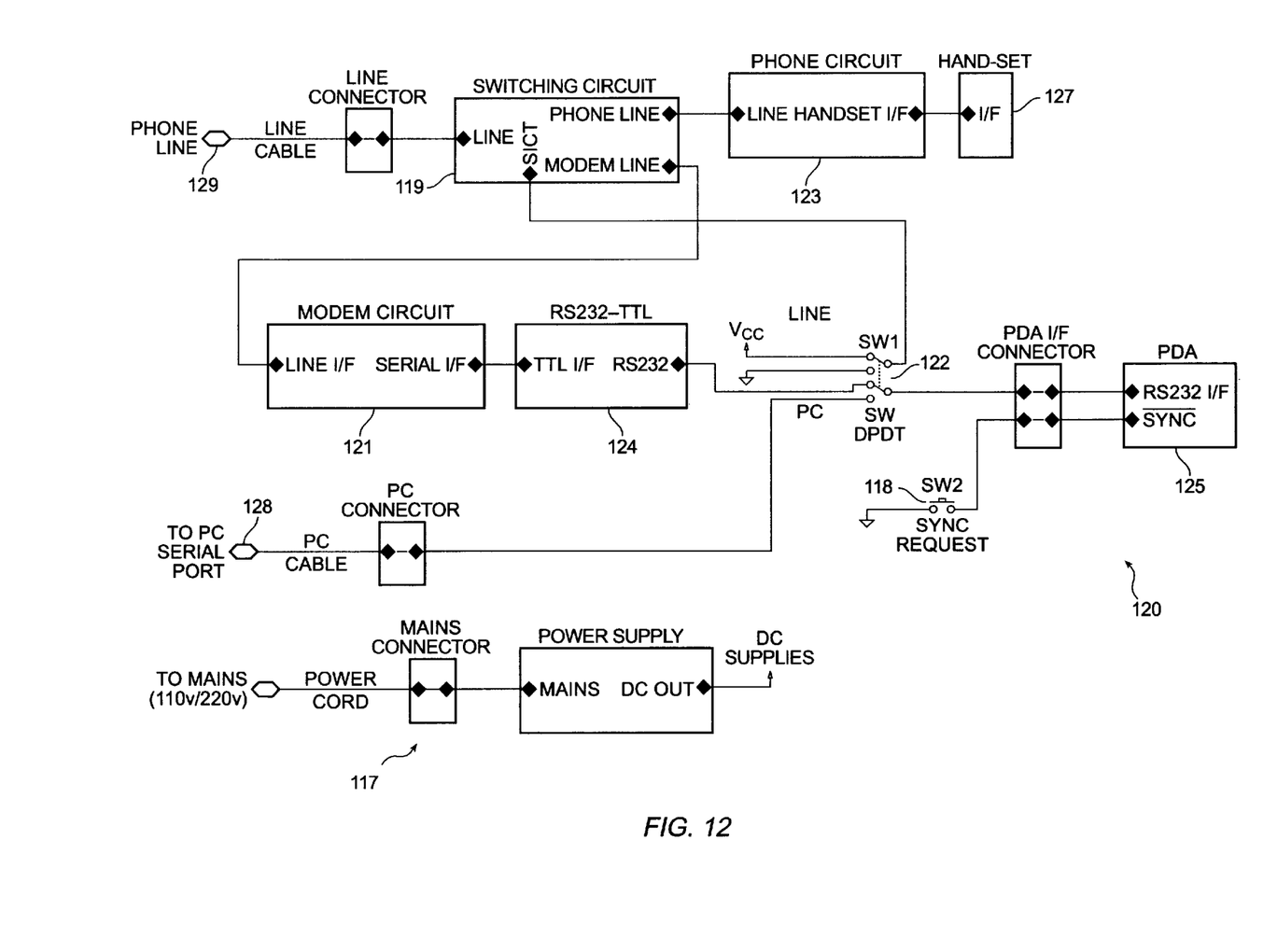
FIG. 12 is a block schematic diagram showing a first implementation for the docking telephone according to the invention.

FIG. 12 is a block schematic diagram showing a first implementation for the docking telephone 120 which may be connected to either a PC, e.g. for synchronizing the PDA 125, or to a telephone line 129. In this implementation standard components are used. For example, the docking telephone is powered by a standard low voltage power supply 117.

The modem 121 is a standard modem with dialing, and optionally Class features functionality. In addition, the docking telephone has an internal switch (relay) 122 that disconnects (mutes) the telephone when the modem is connected for data transfer. This functionality is found on most standard modems. The switch operates a switching circuit 119 to effect an appropriate connection to the telephone line.

The telephone circuit 123 is a standard POTS telephone that includes a handset 127. The optional RS232 adapter circuit 124 is the same as the adapter circuit found inside the standard PDA cradle (for those PDAs that require such an adapter). A sync request switch 118 is provided to alert the PDA when synchronization with a PC is desired, i.e. when the PDA is coupled to a PC The switch circuitry is either mechanically operated by the user or electronically controlled by the PDA software. Normally, the modem is connected to the PDA 125 through this switch. A key advantage of this implementation is the use of standard components. One disadvantage is that dialing operations performed by the user using the telephone keypad are not transferred to the PDA and thus can not be stored in the PDA's redial-list for future redial operations.

Figure 13:
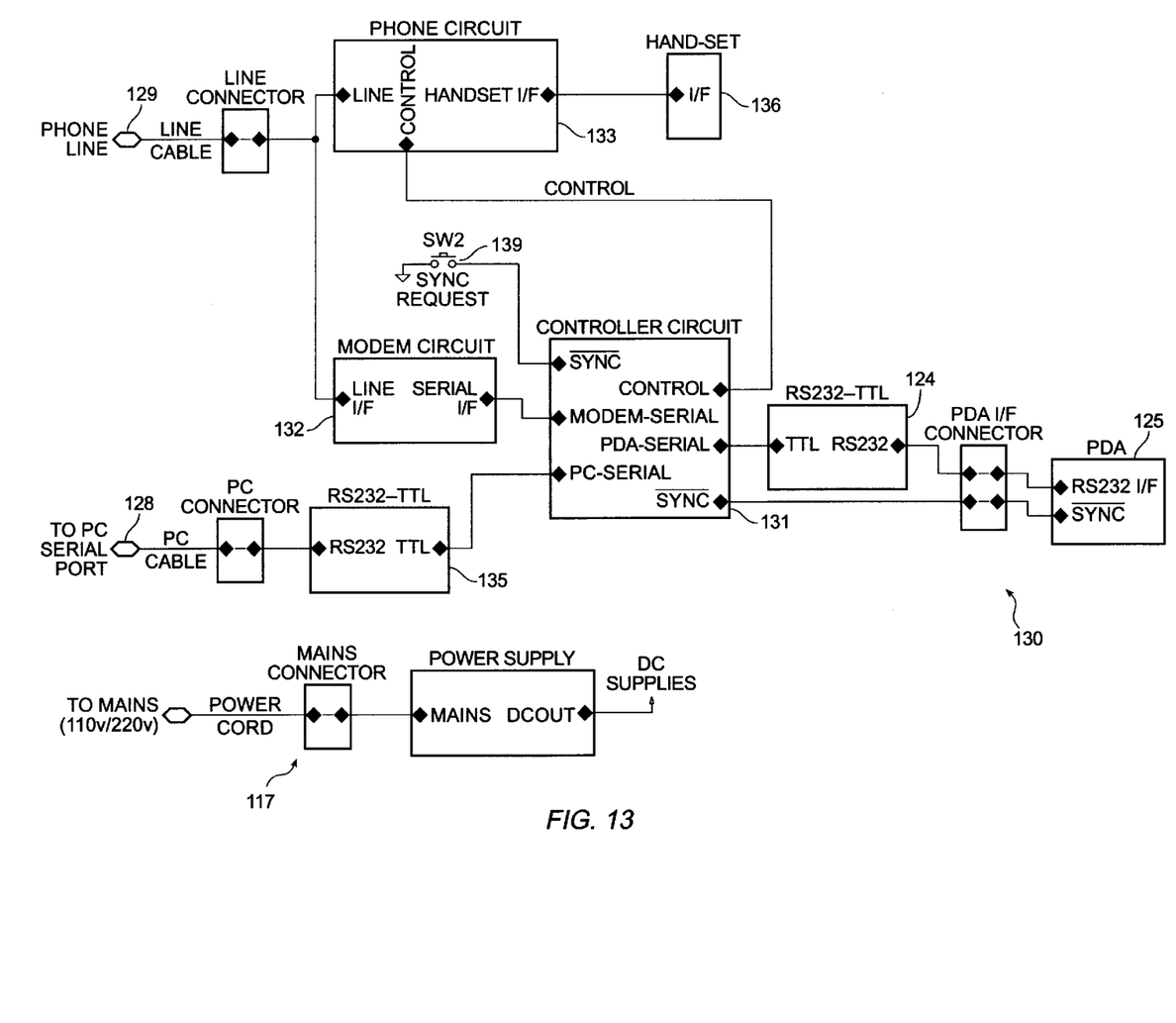
FIG. 13 is a block schematic diagram showing a second implementation for the docking telephone according to the invention.

FIG. 13 is a block schematic diagram showing a second implementation for the docking telephone 130. In this implementation, a special controller circuit 131 is used to control the modem 132, the telephone 133 (which includes a handset 136), and PC synchronization (if selected and initiated by actuation of the sync request switch 139). The telephone circuit receives commands from the controller. The controller in this implementation interfaces between the PDA 125 on one side and the telephone, the modem, and the PC 128 on the other. In addition, the electronic switch for PC synchronization and the RS232 adapter 124/135 (if required) may be implemented as part of the controller. Further, a telephone keypad (not shown) may be included for telephone line signaling and for operation of the controller (off-line mode), for example to communicate with the PDA to capture keystrokes, e.g. for redialing and address book entry from the telephone.

Figure 14:
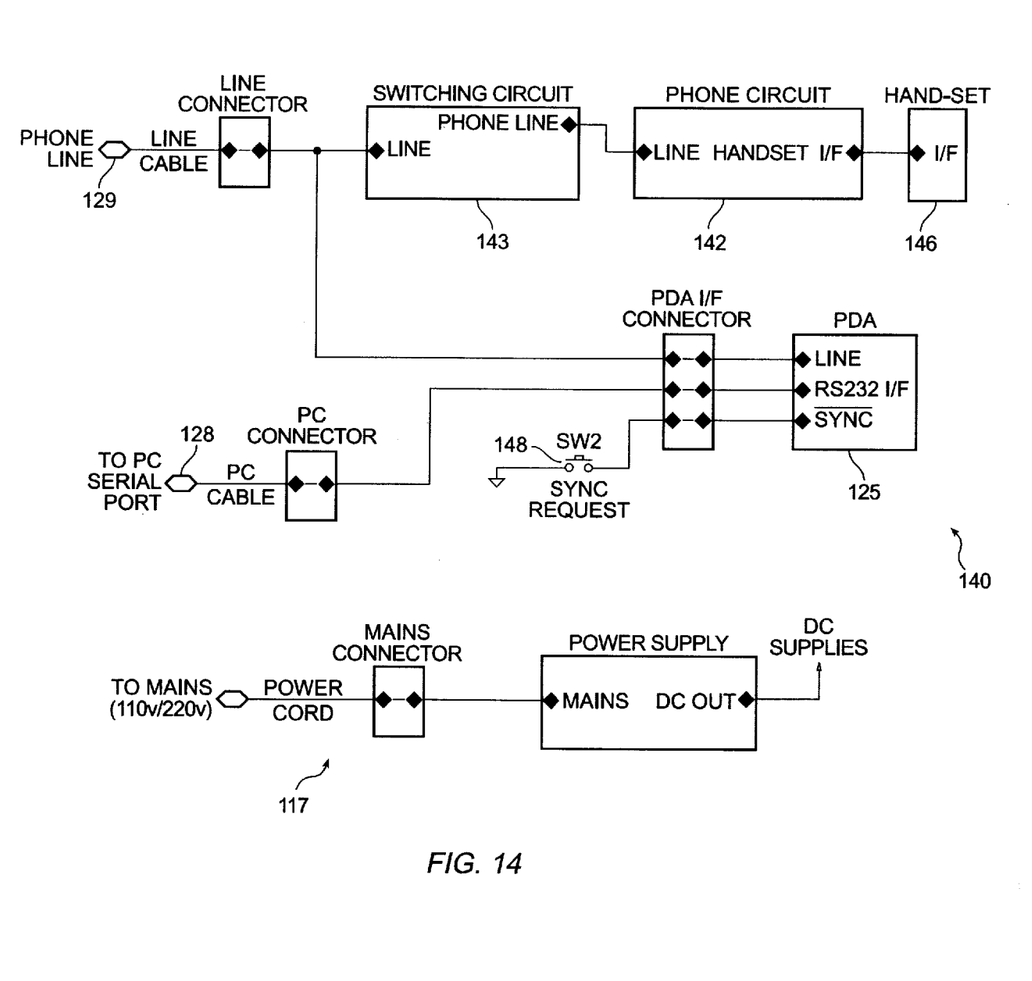
FIG. 14 is a block schematic diagram showing a third implementation for the docking telephone according to the invention.

FIG. 14 is a block schematic diagram showing a third implementation for the docking telephone 140. This implementation is used when the PDA 125 already includes a built-in modem. A loop current sense circuit is implemented as part of the telephone 142 (which includes a handset 146). When the PDA's modem is connected for data transfer, the telephone is muted using an internal relay (switch) 143. This relay is controlled by the loop current sense circuit. This implementation of the invention may also include an RS232 adapter (not shown) if necessary. The PDA in this case provides both a line signal for telephonic communications and a synchronization signal (actuated by operation of the sync request switch 148) to allow the PDA to be synchronized with a PC.

Although the invention is described herein with reference to the preferred embodiment, one skilled in the art will readily appreciate that other applications may be substituted for those set forth herein without departing from the spirit and scope of the invention. Accordingly, the invention should only be limited by the claims included below.

What is claimed is:

1. A telephone comprising:

a telephone housing including a fully functional basic telephone, the housing including a keypad, a handset and a telephone circuit for connection to a telephone line;

a docking port disposed in said telephone housing for receiving and retaining a personal digital assistant (PDA) in contact with said housing, said docking port oriented so that the PDA's display and controls remain visible, functional and accessible while the PDA is docked;

a modem disposed within said housing, said modem capable of implementing CLASS functions, and configured to activate the PDA when the telephone circuit receives a telephone call;

a data exchange and communication bus interconnecting the PDA, said modem and said telephone circuit;

a first program resident in the PDA for controlling said modem and said telephone circuit and implementing telephony functions and on-line functions including sending and receiving e-mail;

a second program resident in the PDA that recognizes when the PDA is docked with said docking port and automatically utilizes enlarged fonts, icons and display settings for data display on the PDA display in at least one PDA program; and a data port through which the PDA may be coupled to a user's computer through said data exchange and communication bus.

2. A telephone in accordance with claim 1, further comprising:
   a power supply for providing electricity for recharging and operating the PDA when the PDA is attached to said docking port.

3. A telephone in accordance with claim 1, wherein said first program implements at least one of: CLASS functions, caller ID, three way calling, e-mail, web browsing, speed dial, direct dialing from PDA's address book, voice mail, network functions.

4. A telephone in accordance with claim 1, wherein said telephone includes a controller circuit through which the user controls the modem, the telephone and PC synchronization.

5. A telephone in accordance with claim 4, wherein said first program includes additional software allowing it to control the controller circuit for implementing telephony functions and on-line functions including sending and receiving e-mail.

6. A telephone in accordance with claim 1, wherein said docking port comprises: a standard interface having adapters for any of various PDAs.

7. A telephone in accordance with claim 1, wherein data exchange is enabled through any of an infrared, RF or inductive interface.

8. A method for docking a personal digital assistant (PDA) with a telephone, comprising:
   attaching the PDA to the telephone through a docking port that securely holds the PDA in place and allows full use and visibility of the PDA's display;
   interconnecting the attached PDA to the modem and telephone circuits of the telephone;
   controlling the telephone's communication capacities through software resident in the PDA allowing the PDA to perform telephony functions and on-line functions including sending and receiving e-mail;
   activating a program automatically upon contact with the docking port enlarging the font and display settings of the PDA display in at least one PDA program while the PDA is docked.

9. A method of claim 8, further comprising interconnecting the PDA to a user's computer through the docking port.

10. A method of claim 8, further comprising activating the attached PDA whenever the telephone receives a telephone call.

11. A method of claim 8, further comprising recharging the PDA through a power source connected to the PDA though the docking port.

12. A method of claim 8, further comprising controlling the telephone's communication capacities through software resident in the PDA allowing the PDA to implement at least one of: CLASS functions, caller ID, three way calling, e-mail, web browsing, speed dial, direct dialing from PDA's address book, voice mail, network functions.

* * * * *

UNITED STATES PATENT AND TRADEMARK OFFICE
CERTIFICATE OF CORRECTION

PATENT NO. : 6,266,539 B1  
DATED : July 24, 2001  
INVENTOR(S) : Teddy Pardo

It is certified that error appears in the above-identified patent and that said Letters Patent is hereby corrected as shown below:

Column 1,
Line 51, replace "ForA" with -- For A --.
Lines 58-59, delete the paragraph.
Line 61, replace "I s" with -- Is --.

Column 2,
Line 13, after "1996" insert -- ); --.
Line 22, after "1994" insert -- ); --.
Line 37, replace "Ô920" with -- '920 --.
Line 51, delete "Is".
Line 57, replace "Is" with -- is --.
Line 62, before "all" insert -- " --.

Column 4,
Line 21, replace "10a" with -- 10b --.
Line 29, delete "and".

Column 7,
Line 22, replace "PDA 1" with -- PDA 31 --.
Line 41, before "manner" insert -- a --.

Column 9,
Line 23, after "10a" insert -- is --.

Column 12,
Line 9, after "e-mail;" insert -- and --.

Signed and Sealed this

Sixteenth Day of July, 2002

Attest:

JAMES E. ROGAN
*Attesting Officer*  *Director of the United States Patent and Trademark Office*